(12) United States Patent
Tseng

(10) Patent No.: US 11,256,163 B2
(45) Date of Patent: Feb. 22, 2022

(54) CAMERA DEVICE WITH A CLAMPING MODULE

(71) Applicant: Cheng Uei Precision Industry Co., LTD., New Taipei (TW)

(72) Inventor: Chi-Ming Tseng, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/069,860

(22) Filed: Oct. 13, 2020

(65) Prior Publication Data

US 2021/0165304 A1   Jun. 3, 2021

(30) Foreign Application Priority Data

Nov. 29, 2019   (CN) .......................... 201922114735.8

(51) Int. Cl.
| | | |
|---|---|---|
| *G03B 17/56* | (2021.01) | |
| *F16M 13/02* | (2006.01) | |
| *F16M 11/10* | (2006.01) | |

(52) U.S. Cl.
CPC ........... *G03B 17/561* (2013.01); *F16M 11/10* (2013.01); *F16M 13/022* (2013.01)

(58) Field of Classification Search
USPC ........................................................ 396/419
See application file for complete search history.

(56) References Cited

U.S. PATENT DOCUMENTS

| | | | | |
|---|---|---|---|---|
| 6,731,340 B1* | 5/2004 | Lai | ........................ | H04N 5/2252 348/373 |
| 6,812,958 B1* | 11/2004 | Silvester | ............... | G06F 1/1607 348/207.1 |
| 7,431,253 B2* | 10/2008 | Yeh | ........................ | G06F 1/1607 248/181.1 |
| 7,563,040 B2* | 7/2009 | Tsai | ....................... | G06F 1/1616 396/428 |
| 8,054,378 B2* | 11/2011 | Kao | ...................... | H04N 5/2252 348/373 |
| 8,430,594 B2* | 4/2013 | Liu | ....................... | H04N 5/2252 403/321 |
| 2009/0008521 A1* | 1/2009 | Lee | ....................... | F16M 13/022 248/226.11 |

\* cited by examiner

*Primary Examiner* — Clayton E. LaBalle
*Assistant Examiner* — Warren K Fenwick
(74) *Attorney, Agent, or Firm* — Cheng-Ju Chiang

(57) ABSTRACT

A camera device with the clamping module includes a clamping module and a camera module. The clamping module includes a supporting element having a base holder, a sliding element, and an elastic element received between the supporting element and the sliding element. One end of a bottom surface of the base holder extends downward to form a blocking block, the other end of the bottom surface of the base holder extends downward to form a first clamping board. The sliding element is mounted to a bottom of the supporting element. The sliding element is located between the blocking block and the first clamping board. One end of the sliding element has a second clamping board facing to the first clamping board. The camera module is pivoted to a top of the supporting element by a rotation shaft.

20 Claims, 14 Drawing Sheets

CAMERA DEVICE WITH A CLAMPING MODULE

CROSS-REFERENCE TO RELATED APPLICATION

The present application is based on, and claims priority from, China Patent Application No. 201922114735.8, filed Nov. 29, 2019, the disclosure of which is hereby incorporated by reference herein in its entirety.

BACKGROUND OF THE INVENTION

1. Field of the Invention

The present invention generally relates to a camera, and more particularly to a camera device with a clamping module capable of being positioned more stably and being fastened to adjustable viewing angles.

2. The Related Art

In general, a conventional camera has a basic video shoot and transmission function, a static image capturing function, etc. The conventional camera converts images into digital signals which can be recognized by a computer by virtue of processing the images. The conventional camera is mostly fastened to a top of a screen of a notebook computer, and after the images are inputted into the notebook computer by a parallel port and a USB connection element, the images are proceeded with an image restoration.

A Taiwan utility model patent discloses a composition structure improvement of a network camera. The composition structure improvement of the network camera includes a lens unit having a camera function, and a clamping unit used for a clamping and locating function. The lens unit utilizes a connection shaft of a lower end of the lens unit to be connected with a pivoting group. A characteristic of the lens unit is that the clamping unit includes a base board, a first clamping board, a second clamping board and a plurality of elastic elements. Two portions of one side of the base board protrude outward to form two pivoting ears opposite to each other. The other side of the base board forms a hollow shaft hole. The first clamping board and the second clamping board are corresponding to side edges of the base board. Each of the first clamping board and the second clamping board has two pivoting portions opposite to each other. After the two pivoting ears of the base board are interacted with the connection shaft of the lens unit, the base board is fastened between the two pivoting portions of the first clamping board by virtue of a rod passing through the two pivoting portions of the first clamping board. The second clamping board utilizes another rod to penetrate through the two pivoting portions of the second clamping board to be pivoted to and fastened to the shaft hole of the base board and pass through the plurality of the elastic elements to make elastic feet of two ends of each elastic element located between the base board and the second clamping board, so that the second clamping board has an elastic and tensile clamping force, in this way, the composition structure improvement of the network camera is facilitated for being clamped and located to a liquid screen or a location position.

However, a screen frame of the composition structure improvement of the network camera is designed towards a narrower and narrower edge, a foot stool structure of the composition structure improvement of the network camera will partially shield a screen area, so a stability of the composition structure improvement of the network camera is worse to be easily fallen off, and the composition structure improvement of the network camera can just be fastened to one visual angle.

Therefore, it is essential to provide an innovative camera device with a clamping module which is capable of being positioned more stably and being fastened to adjustable viewing angles.

SUMMARY OF THE INVENTION

An object of the present invention is to provide a camera device with a clamping module. The camera device with the clamping module includes a clamping module and a camera module. The clamping module includes a supporting element having a base holder, a sliding element, and an elastic element received between the supporting element and the sliding element. One end of a bottom surface of the base holder extends downward to form a block, the other end of the bottom surface of the base holder extends downward to form a first clamping board. The sliding element is mounted to a bottom of the supporting element. The sliding element is located between the block and the first clamping board. One end of the sliding element has a second clamping board corresponding to and facing to the first clamping board. The camera module is equipped with a rotation shaft. The camera module is pivoted to a top of the supporting element by the rotation shaft.

Another object of the present invention is to provide a camera device with a clamping module. The camera device with the clamping module includes a clamping module and a camera module. The clamping module includes a supporting element, a sliding element, an elastic element, at least two sliding ribs and at least two sliding slots. The supporting element has a base holder, a block positioned at the base holder and extended downward from one end of a bottom surface of the base holder, and a first clamping board extended downward from the other end of the bottom surface of the base holder. The sliding element is mounted to the supporting element. The sliding element has a main body, a second clamping board extended downward from a bottom surface of the main body, and a protrusion protruded upward from one end of the main body and opposite to the block. The second clamping board is corresponding to and faces to the first clamping board. The elastic element is elastically mounted between the block and the protrusion. The at least two sliding ribs are protruded from one of the base holder and the main body. The at least two sliding slots are formed at the other one of the base holder and the main body. The at least two sliding ribs are slidably mounted in the at least two sliding slots. The camera module is pivoted to one of the supporting element and the sliding element of the clamping module.

Another object of the present invention is to provide a camera device with a clamping module. The camera device with the clamping module includes a clamping module and a camera module. The clamping module includes a supporting element, a sliding element, a locking element and an elastic element. One end of a lower surface of the supporting element protrudes downward to form a hollow reinforcing portion, the other end of the lower surface of the supporting element protrudes downward to form a first clamping board. The sliding element is mounted to the lower surface of the supporting element, one end of the sliding element extends downward to form a second clamping board opposite to the reinforcing portion. The second clamping board is spaced from and faces to the first clamping board. The locking element is locked in a middle of the reinforcing portion. The elastic element is received between the supporting element and the sliding element. One end of the elastic element is locked to the sliding element, and the other end of the elastic element abuts against the locking element. The camera module is equipped with a rotation shaft. The camera module is pivoted to a top of the supporting element by the rotation shaft.

As described above, the elastic element is elastically fastened in the holding space which is formed between the sliding element and the supporting element, or the elastic element is mounted in the sliding element, and the one end of the elastic element is locked to the sliding element by one screw, and the other end of the elastic element abuts against the locking element, when the sliding element slides rearward, a rearward pushing force exerted by the sliding element is exerted to the elastic element and the elastic element is compressed by the rearward pushing force of the sliding element, and then, the sliding element is released, the elastic element restores to an original status to generate a frontward pushing force, the sliding element is pushed to slide frontward to form a gripping force by the frontward pushing force of the elastic element, a portion of an electronic equipment is gripped by the sliding element and the supporting element to make the first clamping board and the second clamping board instantly fastened to a frame of the notebook computer or other types of the electronic equipment. Furthermore, after the rotation shaft passes through a second locating hole of a second location portion, a second through-hole of a friction ring and a section of a first locating hole of a first location portion, the rotation shaft is locked to and fastened to the second locating hole of the second location portion, the second through-hole of the friction ring and the section of the first locating hole of the first location portion by use of the screw to make the camera module manually adjust viewing angles of the camera module of the camera device with the clamping module. Two portions of one end of a top surface of the base holder of the supporting element protrude upward to form the two clamping blocks, the two clamping blocks are spaced from each other to form a clamping groove between the two clamping blocks, one end of the cable is positioned in the clamping groove, the two clamping blocks and the clamping groove form a cable clamping mechanism, the cable clamping mechanism is capable of guiding a weight of the cable or a pulling force exerted by an external force to the gripping force generated by the camera device with the clamping module to be supported or absorbed, a rotation angle deviation of the camera module is prevented from being affected on account of a factor of the cable. Thus the camera device with the clamping module is stably fastened to the notebook computer or other types of objects which is capable of adjusting the viewing angles of the camera device with the clamping module.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
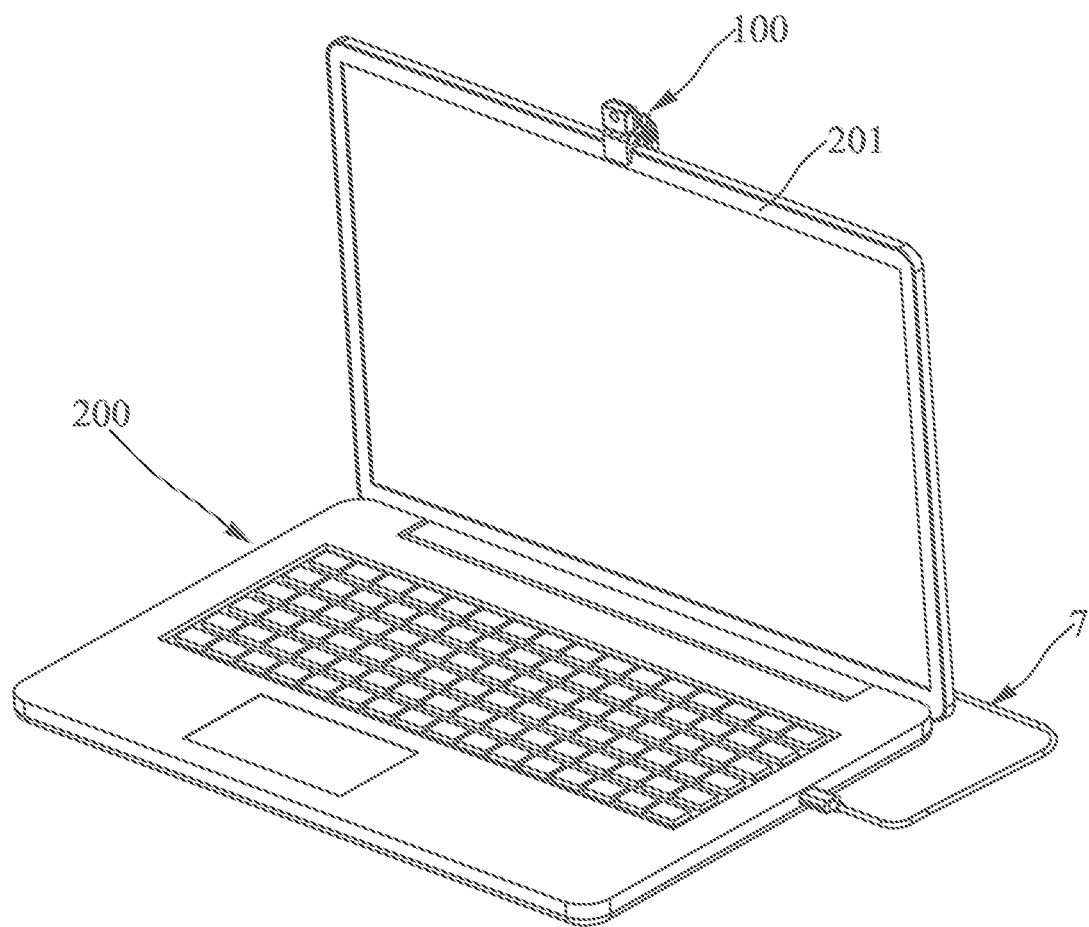
FIG. 1 is a diagrammatic drawing of a camera device with a clamping module in accordance with the present invention, wherein the camera device with the clamping module is mounted to a notebook computer.
Figure 2:
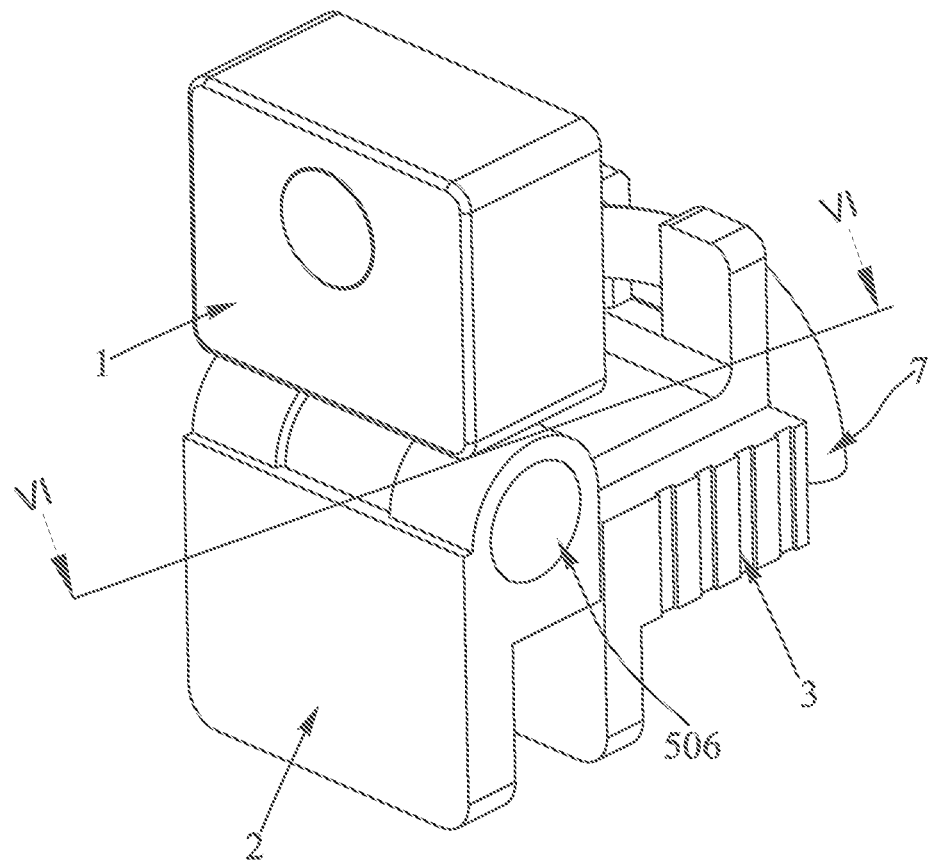
FIG. 2 is a perspective view of the camera device with the clamping module in accordance with a first preferred embodiment of the present invention.
Figure 3:
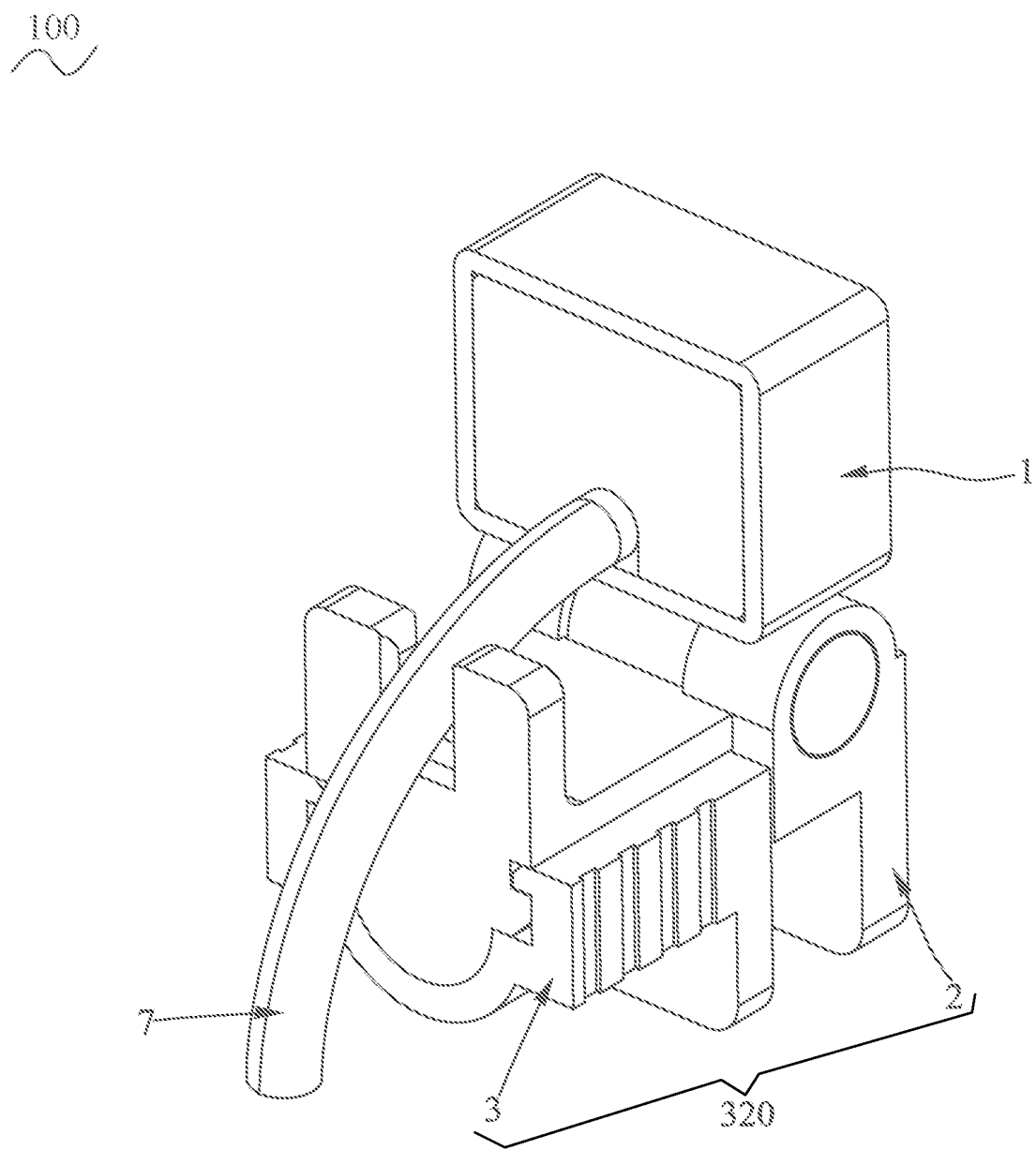
FIG. 3 is another perspective view of the camera device with the clamping module of FIG. 2.
Figure 8:
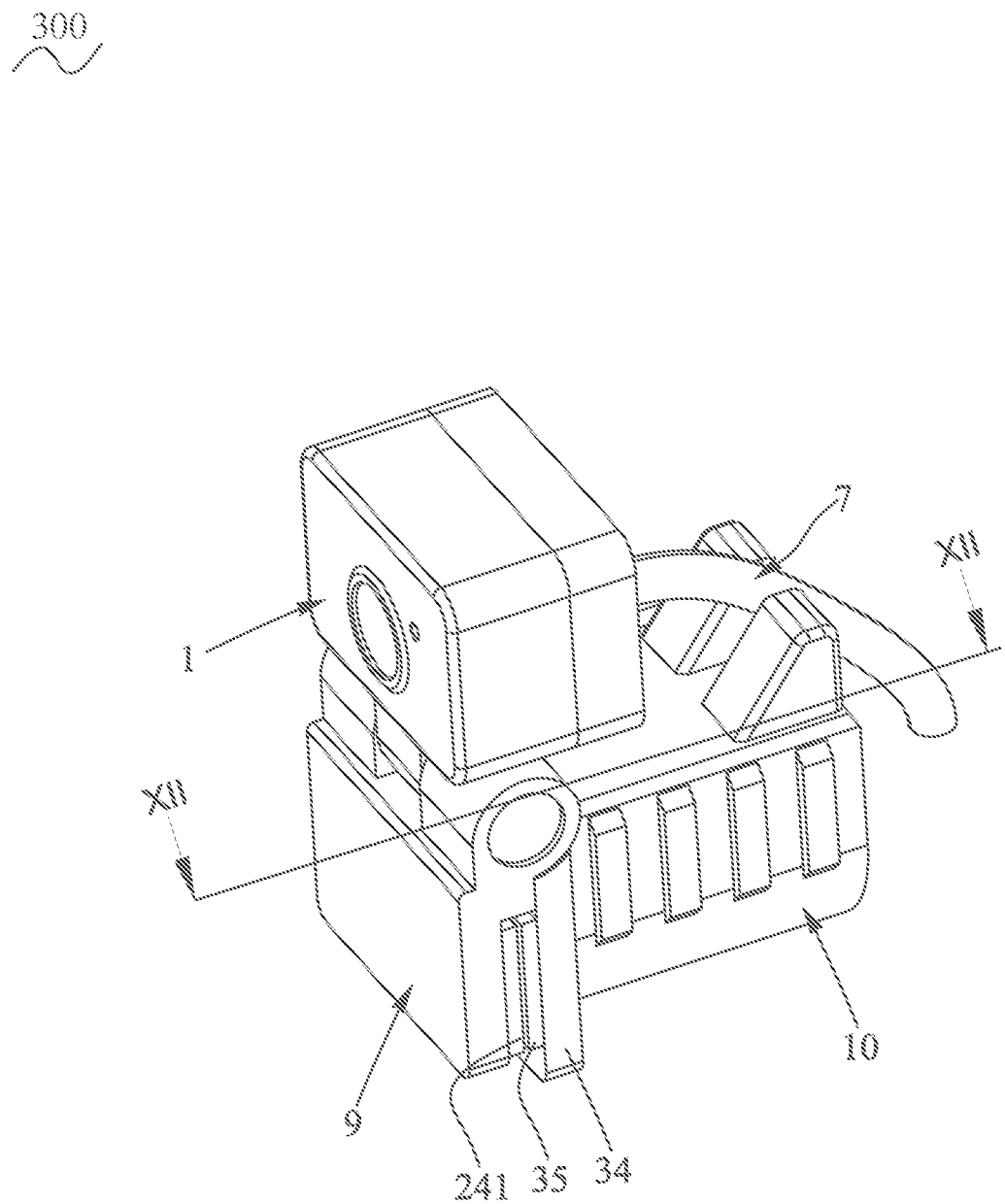
FIG. 8 is a perspective view of a camera device with a clamping module in accordance with a second preferred embodiment of the present invention.
Figure 9:
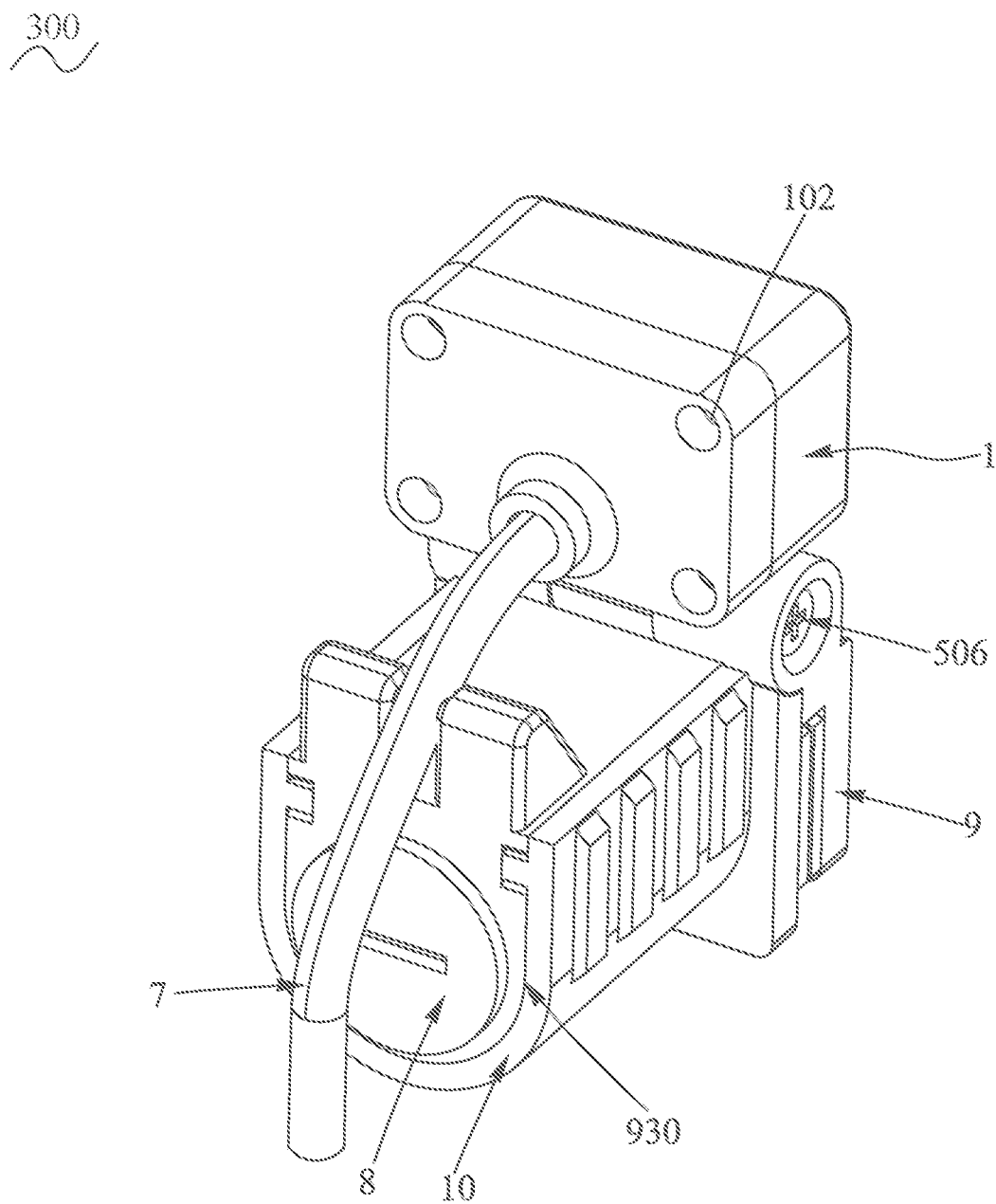
FIG. 9 is another perspective view of the camera device with the clamping module of FIG. 8.
Figure 10:
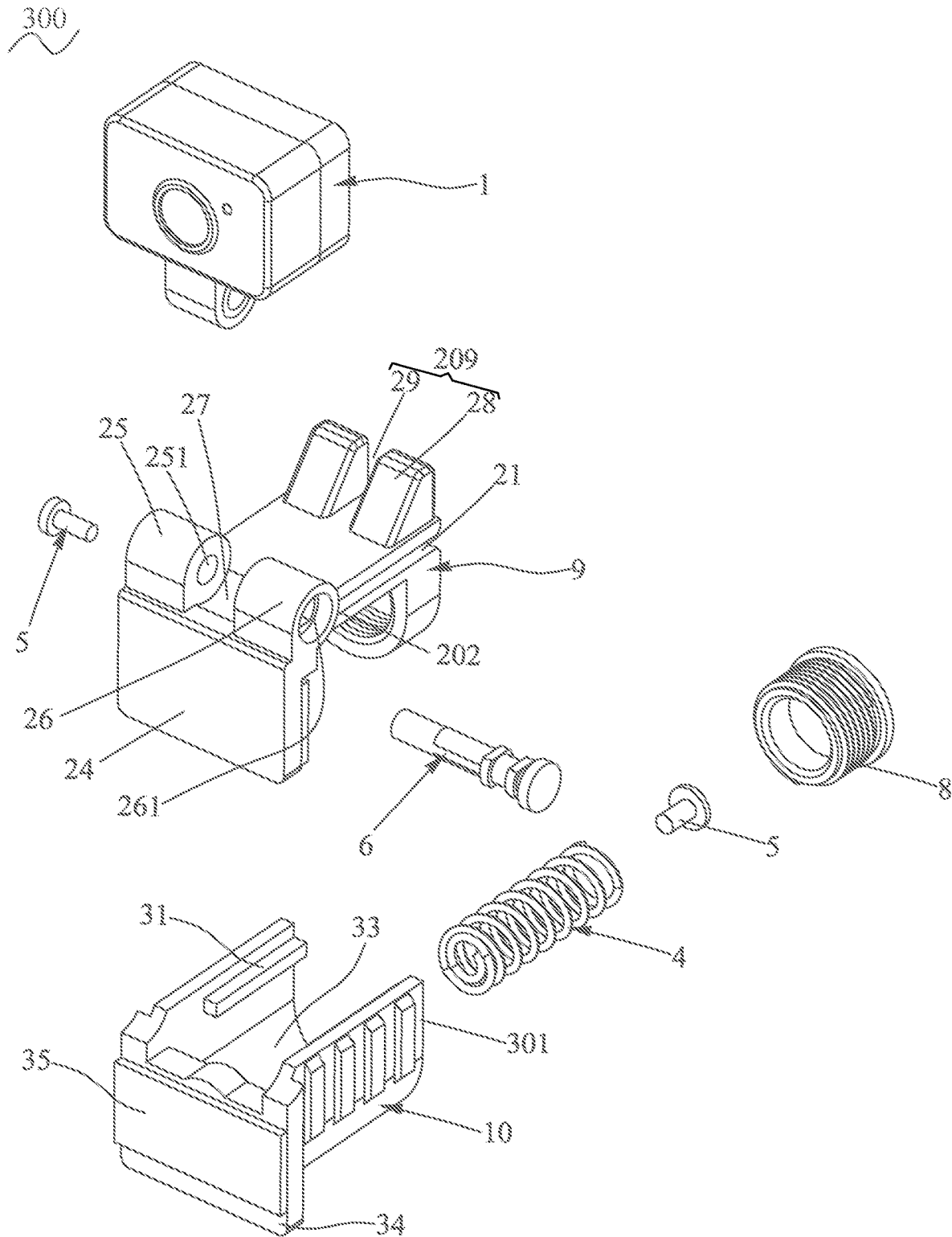
FIG. 10 is an exploded view of the camera device with the clamping module of FIG. 8.
Figure 11:
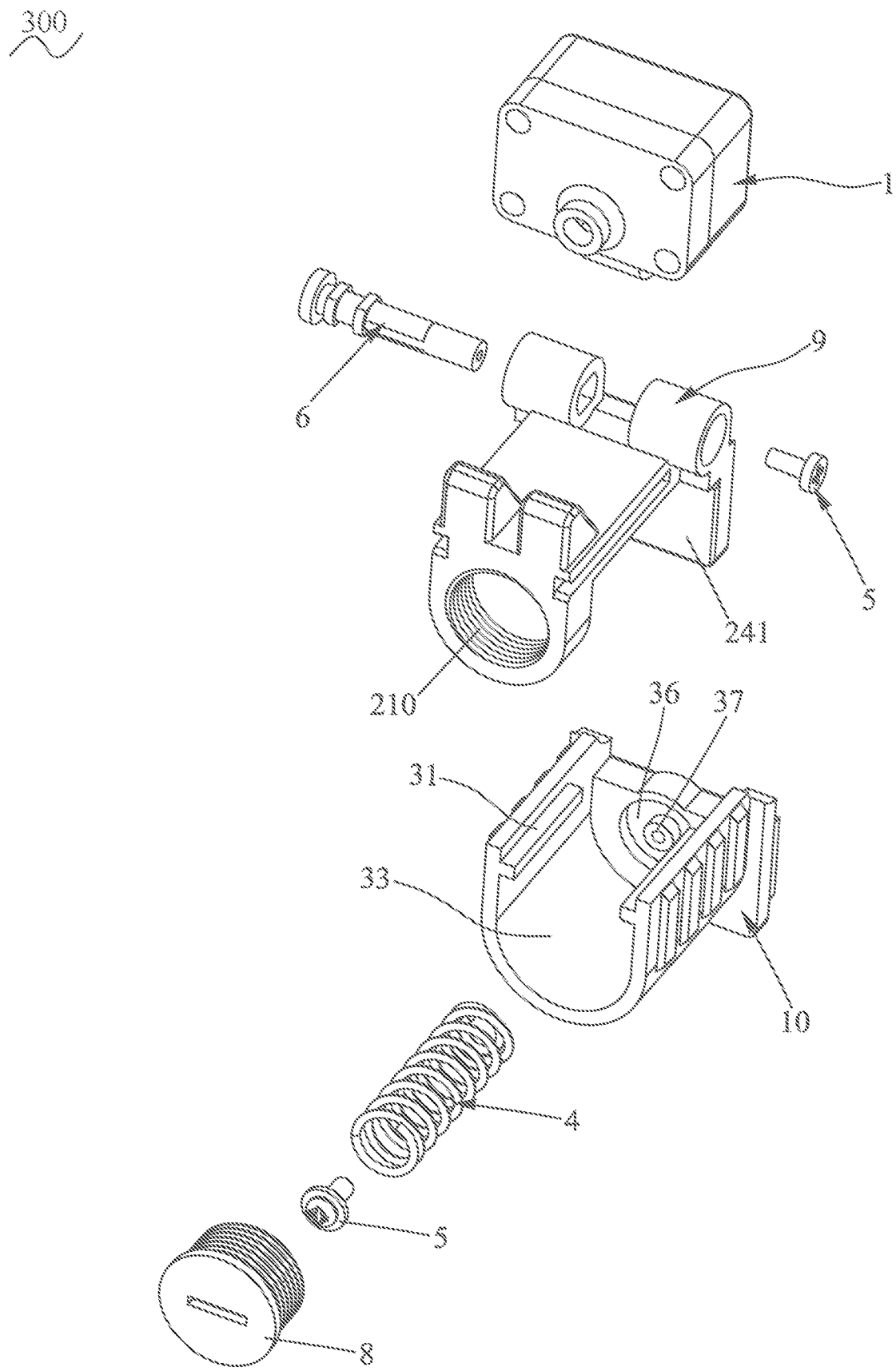
FIG. 11 is another exploded view of the camera device with the clamping module of FIG. 8.
Figure 12:
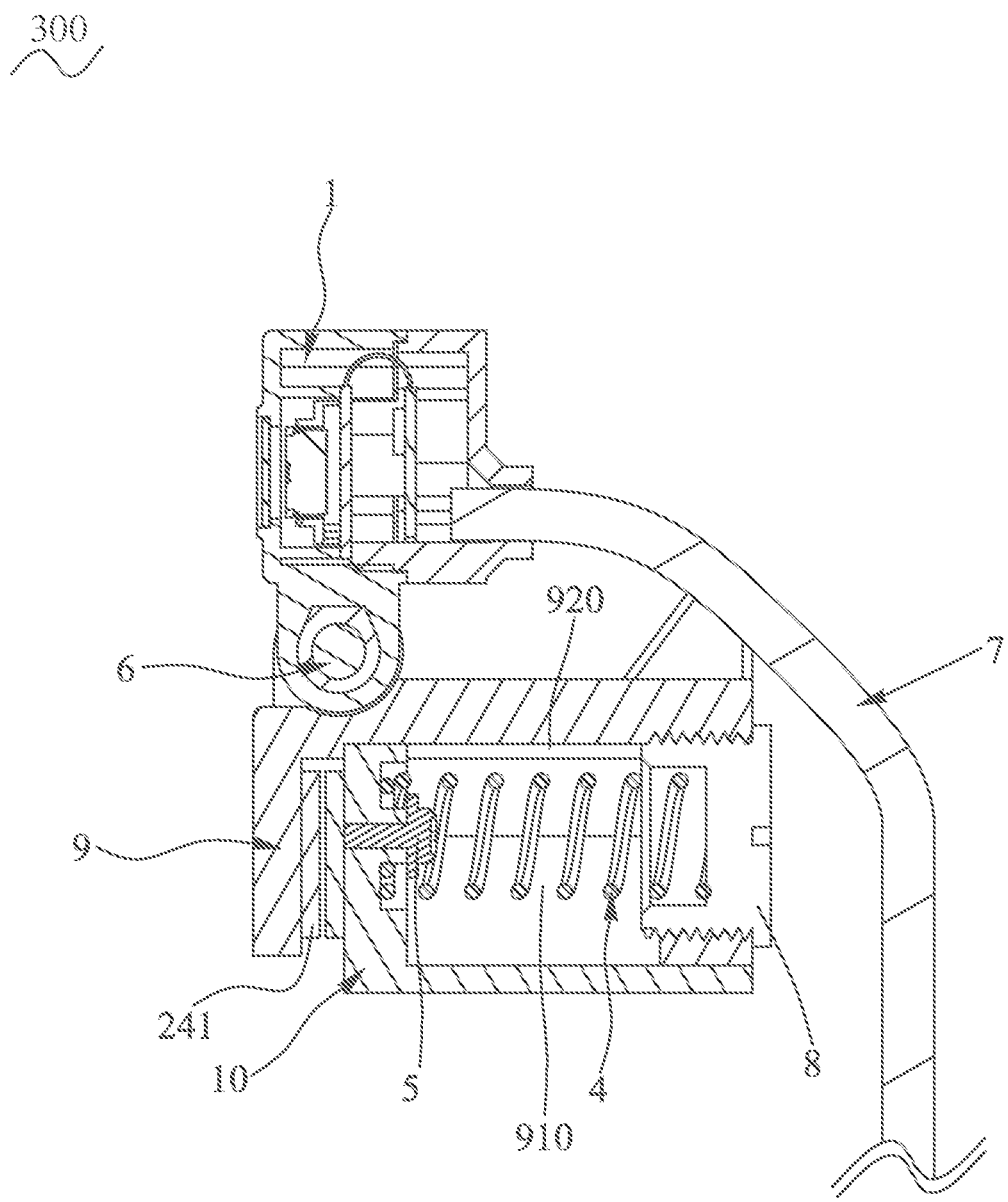
FIG. 12 is a sectional view of the camera device with the clamping module along a line XII-XII of FIG. 8.
Figure 13:
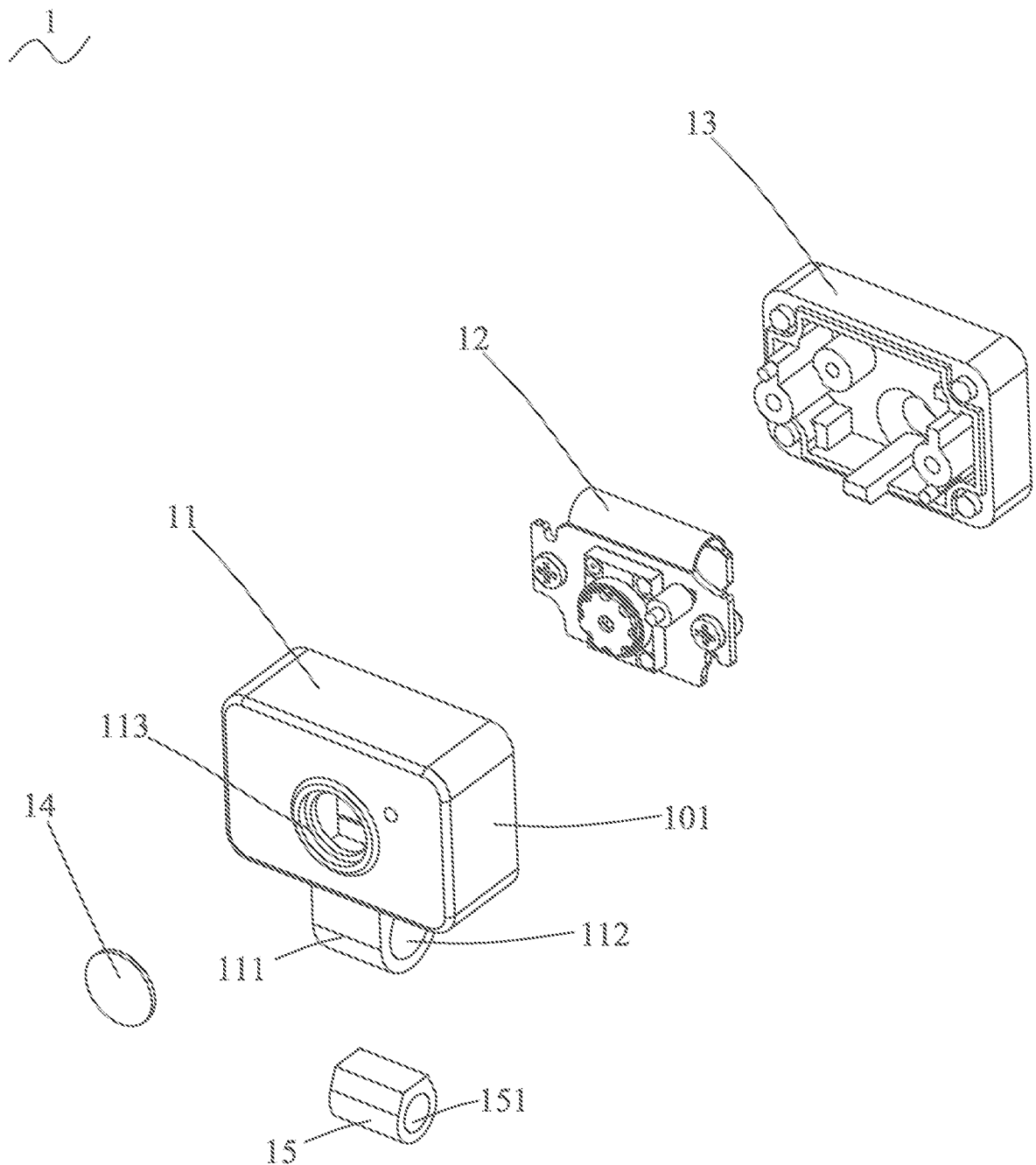
FIG. 13 is an exploded view of a camera module of the camera device with the clamping module of FIG. 8.
Figure 14:
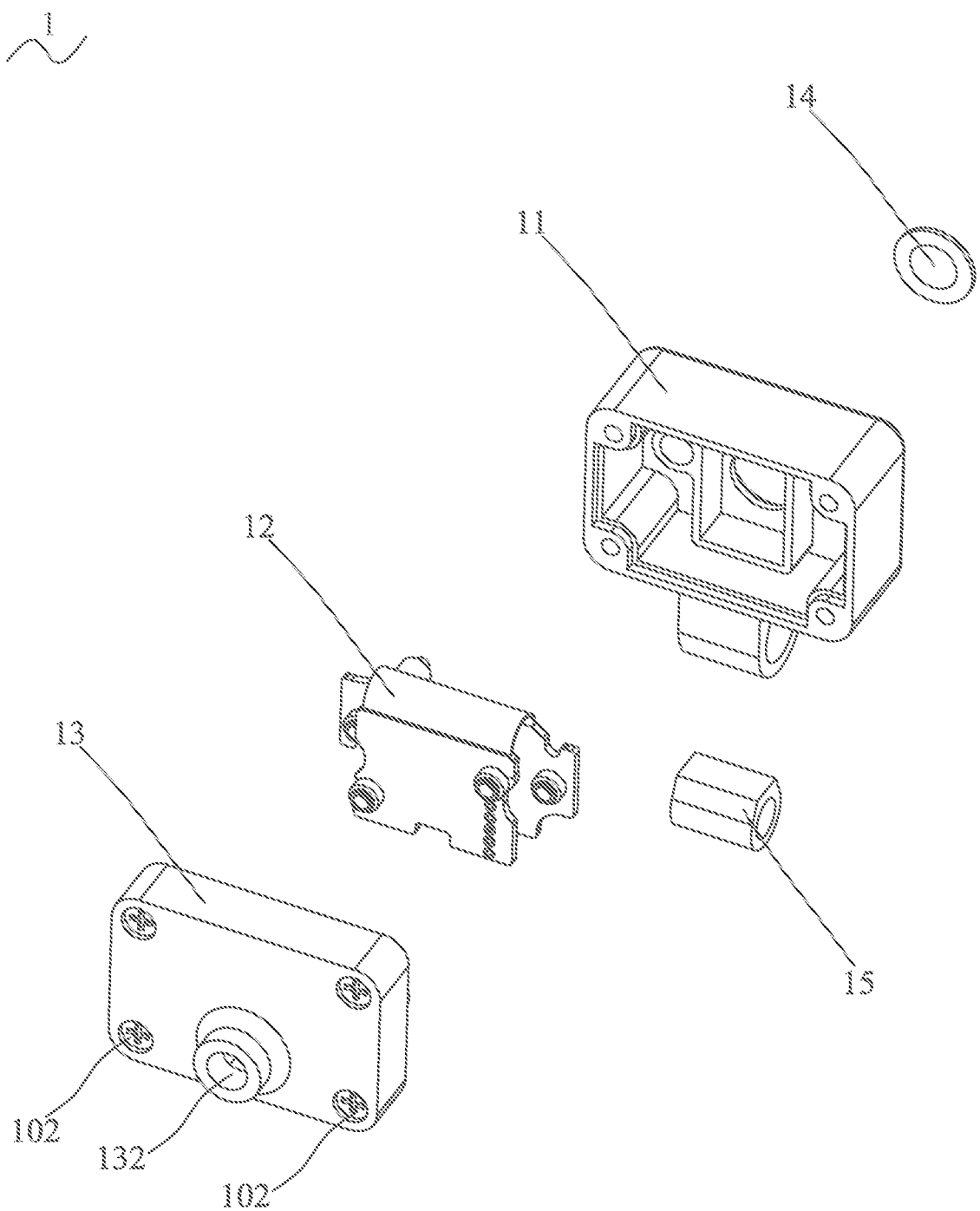
FIG. 14 is another exploded view of the camera module of the camera device with the clamping module of FIG. 8.

With reference to FIG. 1, FIG. 2 and FIG. 8, a camera device with a clamping module 100 in accordance with a first preferred embodiment of the present invention and a camera device with a clamping module 300 in accordance with a second preferred embodiment of the present invention are shown. The camera device with the clamping module 100 is adapted for being assembled to a frame 201 of a notebook computer 200. In a concrete implementation, the camera device with the clamping module 100 is also able to be assembled to other types of electronic equipment.

With reference to FIG. 1 to FIG. 7, the camera device with the clamping module 100 includes a camera module 1, a clamping module 320 which includes a supporting element 2, a sliding element 3 and an elastic element 4, a screw 5, a rotation shaft 6 and a cable 7. The camera module 1 is equipped with the rotation shaft 6. The camera module 1 is assembled to and pivoted to a top of the supporting element 2 by the rotation shaft 6 to rotate to adjust viewing angles of the camera module 1 of the camera device with the clamping module 100. The camera module 1 is pivoted to one of the supporting element 2 and the sliding element 3 of the clamping module 320. The sliding element 3 is mounted to a bottom of the supporting element 2. The sliding element 3 and the supporting element 2 are buckled with each other to form a holding space 203 between the sliding element 3 and the supporting element 2. The elastic element 4 is elastically fastened in the holding space 203. The screw 5 is fastened to one side of the supporting element 2. The rotation shaft 6 is mounted to the other side of the supporting element 2. The rotation shaft 6 and the screw 5 are locked with each other. The rotation shaft 6 is in alignment with the screw 5. One end of the cable 7 is connected to an inside of the camera module 1, and the other end of the cable 7 is connected to the notebook computer 200. In the preferred embodiment, the elastic element 4 is a compression spring. The screw 5 and the rotation shaft 6 are assembled into a rotation structure 506. The camera device with the clamping module 100 includes the rotation structure 506 which includes the screw 5 and the rotation shaft 6.

Figure 4:
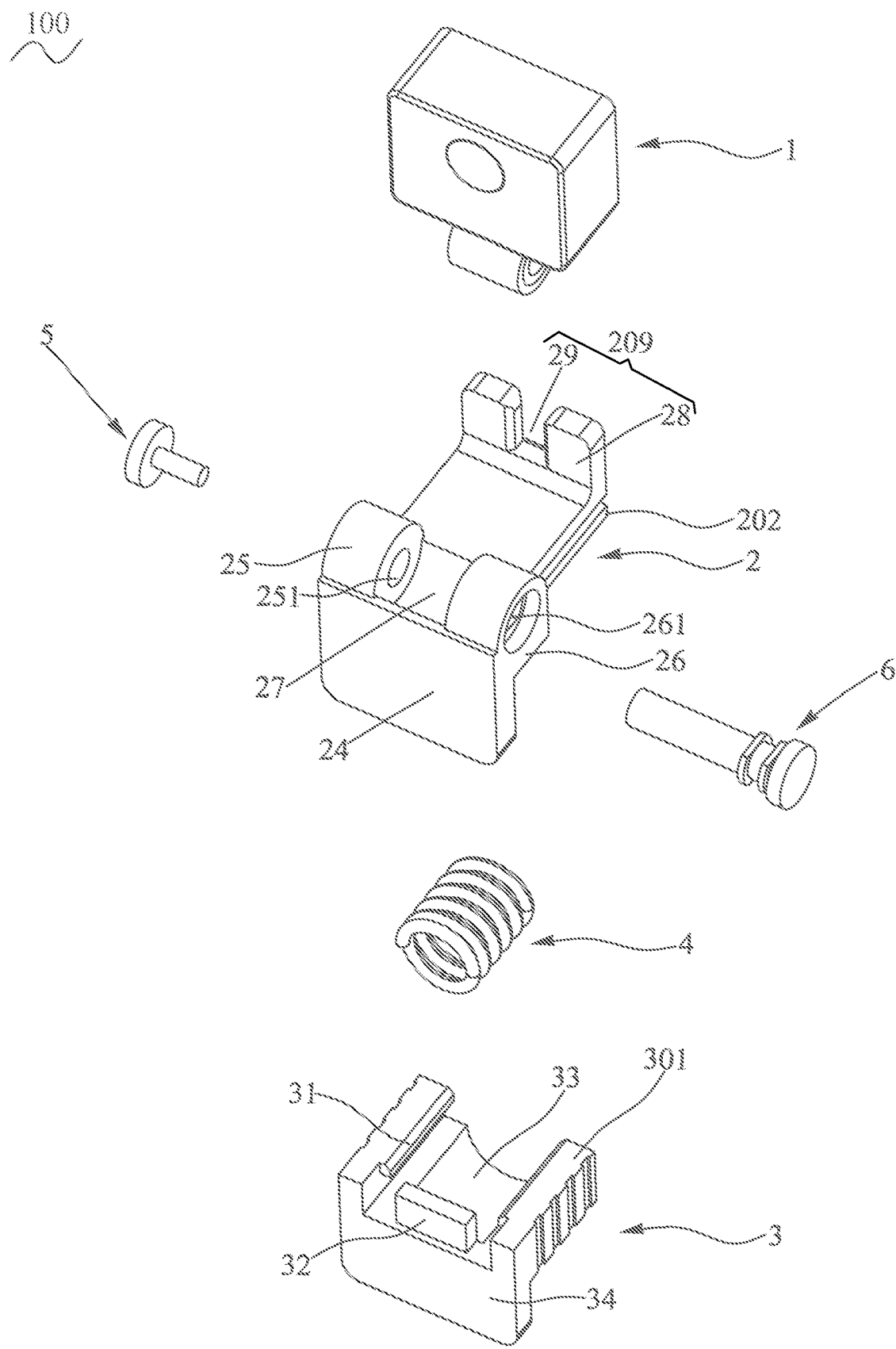
FIG. 4 is an exploded view of the camera device with the clamping module of FIG. 2.
Figure 5:
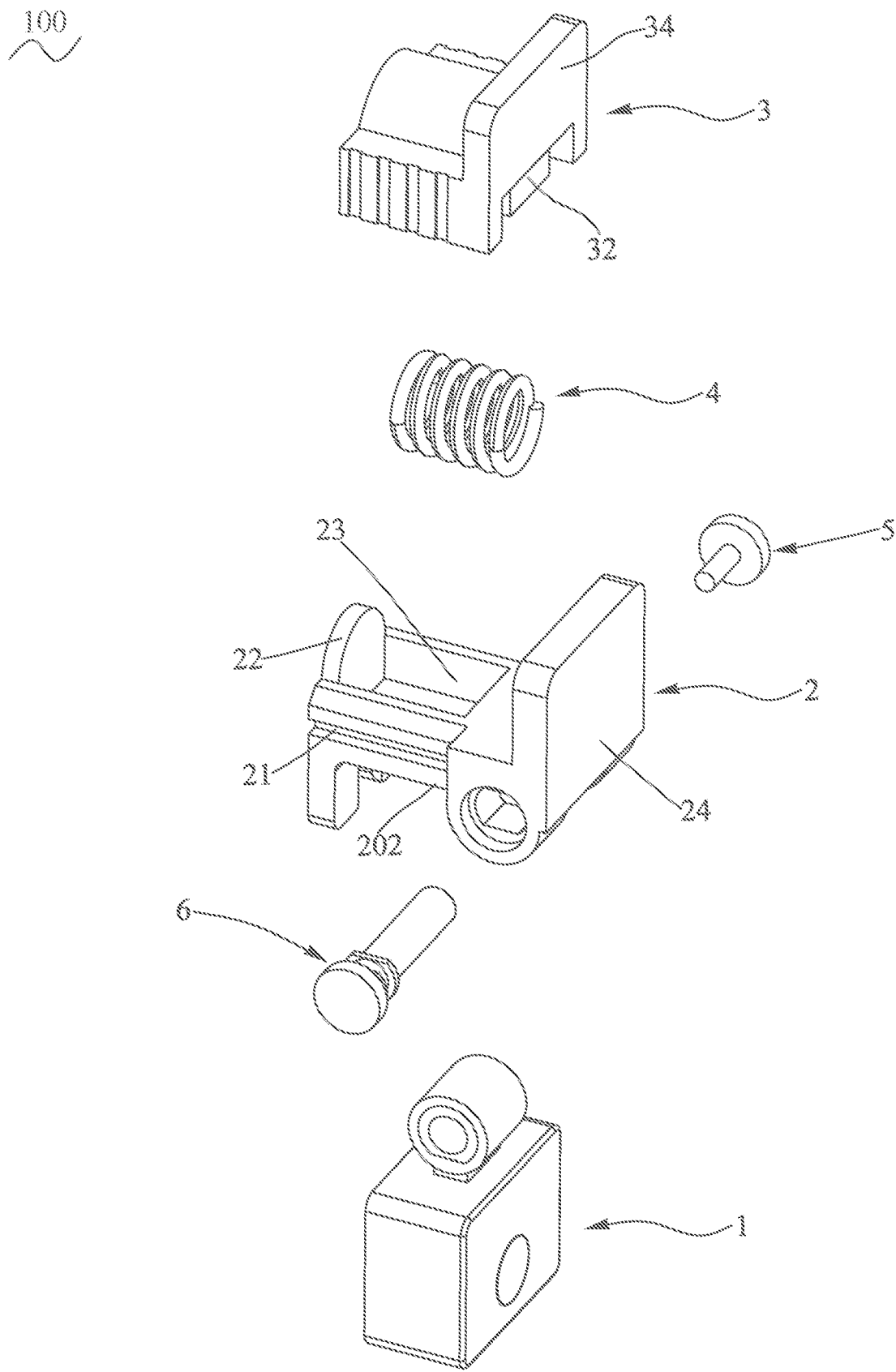
FIG. 5 is another exploded view of the camera device with the clamping module of FIG. 2.
Figure 6:
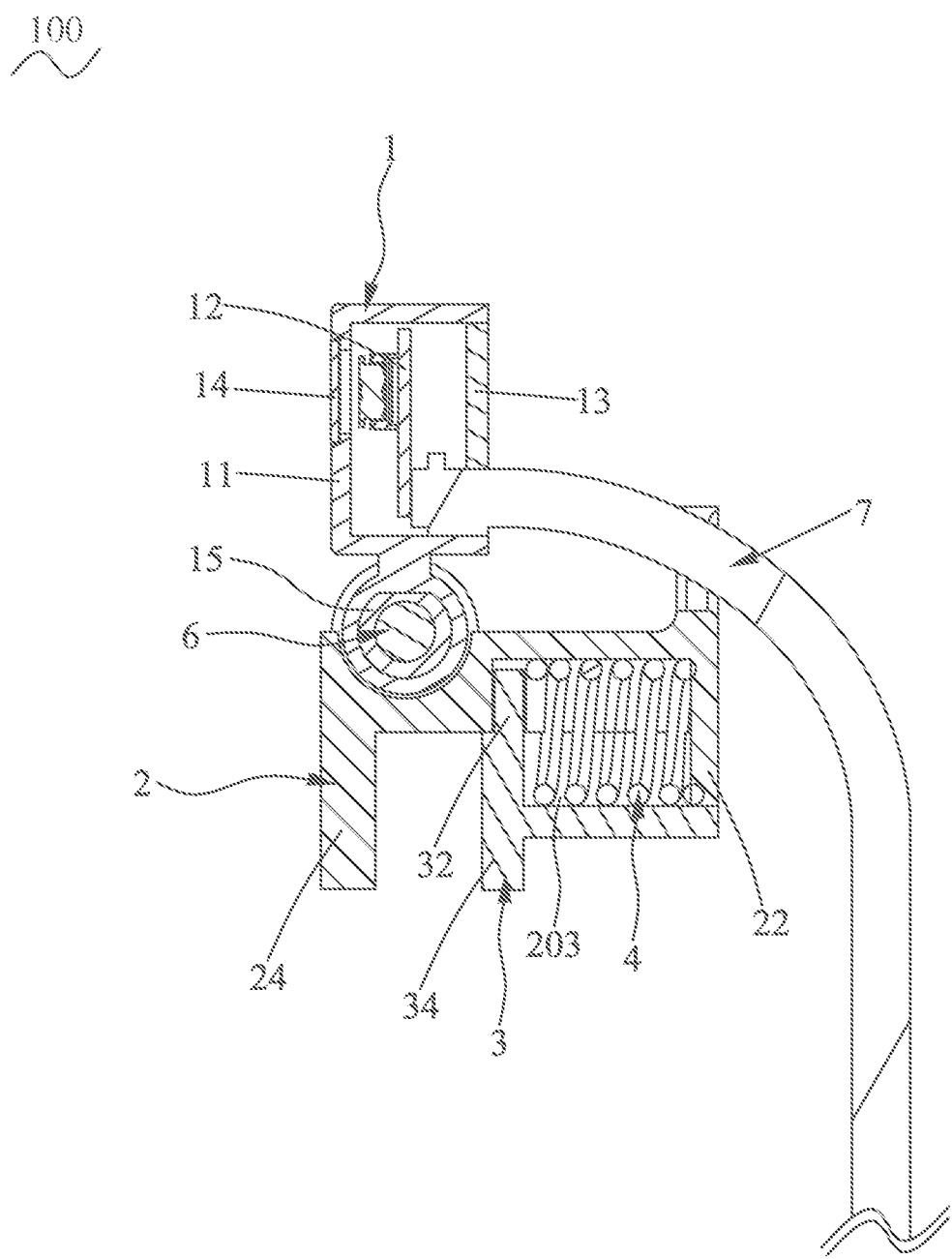
FIG. 6 is a sectional view of the camera device with the clamping module along a line VI-VI of FIG. 2.
Figure 7:
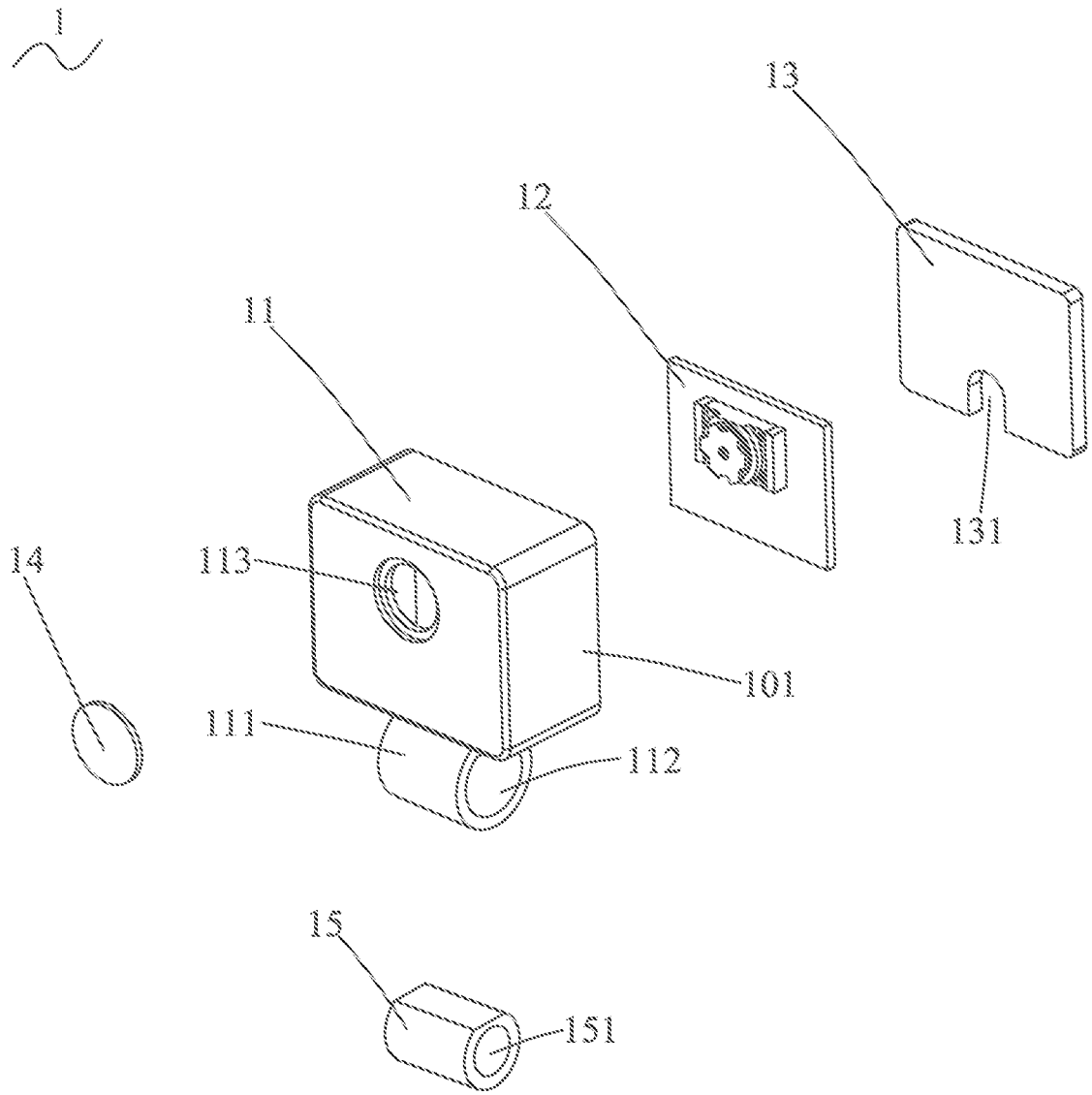
FIG. 7 is an exploded view of a camera module of the camera device with the clamping module in accordance with the first preferred embodiment of the present invention.

Referring to FIG. 2, FIG. 4 and FIG. 7, the camera module 1 includes a front cover 11, an image module 12, a rear cover 13, a transparent piece 14 and a friction ring 15. The image module 12 is disposed in the front cover 11. The image module 12 is used for an image transmission. The rear cover 13 is disposed behind a rear surface of the image module 12. The transparent piece 14 is mounted to a front surface of the front cover 11. The transparent piece 14 is used for prettifying the camera module 1. The friction ring 15 is disposed in a corresponding mechanism of the front cover 11. The friction ring 15 is used for cooperating with the rotation shaft 6 to make the camera module 1 rotate to adjust the viewing angles of the camera module 1.

The front cover 11 has a base portion 101, a cylindrical pivoting portion 111, a first through-hole 112 and a fixing hole 113. A bottom surface of the base portion 101 is connected with the pivoting portion 111. The pivoting portion 111 is mounted to a corresponding structure of the supporting element 2 to realize a location and a fixation between the camera module 1 and the supporting element 2. An inside of a middle of the pivoting portion 111 is the first through-hole 112 extending transversely. The friction ring 15 is received in the first through-hole 112. A middle of the friction ring 15 has a second through-hole 151 transversely penetrating through the friction ring 15. The rotation shaft 6 passes through the second through-hole 151 of the friction ring 15 and the first through-hole 112.

The front cover 11 is of a hollow shape. A rear of the front cover 11 is opened freely. The front surface of the front cover 11 has the fixing hole 113 longitudinally penetrating through the front cover 11. The transparent piece 14 is fixed in the fixing hole 113. A middle of a bottom surface of the rear cover 13 is recessed upward to form a notch 131. One end of the cable 7 is connected to a rear end of the image module 12, and the one end of the cable 7 extends outward and passes through the notch 131.

The supporting element 2 has at least two sliding slots 21, a block 22, an accommodating space 23, a first clamping board 24, a first location portion 25, a second location portion 26, a receiving groove 27, a plurality of clamping blocks 28 and a clamping groove 29. At least two portions of middles of two opposite side surfaces of the supporting element 2 are recessed inward to form the at least two lengthwise sliding slots 21. In the first preferred embodiment, the middles of the two opposite side surfaces of the supporting element 2 are recessed inward to form two lengthwise sliding slots 21. Each sliding slot 21 is used for clamping a corresponding sliding portion of the sliding element 3 to make the sliding element 3 slide frontward and rearward.

The supporting element 2 has a substantially rectangular base holder 202. One end of a bottom surface of the base holder 202 extends downward to form the block 22. The block 22 is positioned at the base holder 202 and is extended downward from the one end of the bottom surface of the base holder 202. The first clamping board 24 is extended downward from the other end of the bottom surface of the base holder 202. The block 22 abuts against one end of the sliding element 3. A middle of the one end of the bottom surface of the base holder 202 is recessed inward to form the accommodating space 23. The other end of the bottom surface of the base holder 202 extends downward to form the first clamping board 24. One end of the accommodating space 23 is blocked by the block 22, and the accommodating space 23 is formed between the block 22 and the first clamping board 24. The elastic element 4 is partially received in the accommodating space 23 with a bottom of the elastic element 4 being exposed out of the accommodating space 23. The elastic element 4 is received in the holding space 203 between the supporting element 2 and the sliding element 3. One end of the elastic element 4 abuts against the block 22, and the other end of the elastic element 4 abuts against a corresponding wall of the sliding element 3. The first clamping board 24 cooperates with a corresponding clamping structure of the sliding element 3 to make the camera device with the clamping module 100 stably grip an object which is an electronic equipment.

Several portions of one end of a top surface of the base holder 202 protrude upward to form the plurality of the clamping blocks 28. Two portions of the one end of the top surface of the base holder 202 protrude upward to form two clamping blocks 28. The two clamping blocks 28 are spaced from each other to form the clamping groove 29 between the two clamping blocks 28. One end of the cable 7 is positioned in the clamping groove 29. The two clamping blocks 28 and the clamping groove 29 form a cable clamping mechanism 209. The cable clamping mechanism 209 is capable of guiding a weight of the cable 7 or a pulling force exerted by an external force to a gripping force generated by the camera device with the clamping module 100 to be supported or absorbed, a rotation angle deviation of the camera module 1 is prevented from being affected on account of a factor of the cable 7.

One side of the top surface of the base holder 202 protrudes upward to form the annular first location portion 25. An inside of a middle of the first location portion 25 has a cylindrical first locating hole 251 transversely penetrating through the middle of the first location portion 25. The screw 5 is mounted in the first locating hole 251 of the first location portion 25. The other side of the top surface of the base holder 202 protrudes upward to form the annular second location portion 26. An inside of a middle of the second location portion 26 has an irregular second locating hole 261. The second location portion 26 is spaced from the first location portion 25 to form the receiving groove 27 between the second location portion 26 and the first location portion 25. The rotation shaft 6 is mounted in the second location portion 26. The pivoting portion 111 of the camera module 1 is received in the receiving groove 27. The first locating hole 251 of the first location portion 25, the second locating hole 261 of the second location portion 26, the second through-hole 151 of the friction ring 15 and the first through-hole 112 of the pivoting portion 111 are concentric. After the rotation shaft 6 passes through the second locating hole 261 of the second location portion 26, the second through-hole 151 of the friction ring 15 and a section of the first locating hole 251 of the first location portion 25, the rotation shaft 6 is locked to and fastened to the second locating hole 261 of the second location portion 26, the second through-hole 151 of the friction ring 15 and the section of the first locating hole 251 of the first location portion 25 by use of the screw 5 to make the camera module 1 manually adjust the viewing angles of the camera module 1.

The sliding element 3 is located between the block 22 and the first clamping board 24. The sliding element 3 has at least two sliding ribs 31, a protrusion 32, a cavity 33 and a second clamping board 34. The one end of the sliding element 3 has the second clamping board 34 corresponding to and facing to the first clamping board 24. The elastic element 4 is elastically mounted between the block 22 and the protrusion 32. The elastic element 4 is elastically mounted among the block 22, the protrusion 32 and the second clamping board 34. Two opposite sides of an inside of the sliding element 3 have the at least two sliding ribs 31 protruded inward. The at least two sliding ribs 31 are clamped in the at least two sliding slots 21. In the first preferred embodiment, the two opposite sides of the inside of the sliding element 3 have two sliding ribs 31 protruded inward. The sliding element 3 has a substantially rectangular main body 301. The second clamping board 34 is extended downward from a bottom surface of the main body 301. The protrusion 32 is protruded upward from one end of the main body 301 and opposite to the block 22. The at least two sliding ribs 31 are protruded from one of the base holder 202 and the main body 301. The at least two sliding slots 21 are formed at the other one of the base holder 202 and the main body 301. The at least two sliding ribs 31 are slidably mounted in the at least two sliding slots 21. A middle of a top surface of the main body 301 is recessed downward to form the cavity 33. Upper portions of inner surfaces of two side walls of the cavity 33 protrude face to face to form the two sliding ribs 31. The two sliding ribs 31 are upward clamped in the two sliding slots 21 to make the sliding element 3 slide frontward and rearward. One end of the main body 301 protrudes upward to form the protrusion 32. A top of a front wall of the cavity 33 protrudes upward to form the protrusion 32. The protrusion 32 is blocked in the other end of the accommodating space 23. The protrusion 32 is corresponding to and opposite to the block 22. The cavity 33 and the accommodating space 23 are connected and integrated to form the holding space 203. The elastic element 4 is received in the holding space 203. The one end of the main body 301 extends downward and opposite to the protrusion 32 to form the second clamping board 34. The second clamping board 34 cooperates with the first clamping board 24 to make the camera device with the clamping module 100 grip the electronic equipment stably.

When the camera device with the clamping module 100 grips the electronic equipment, the sliding element 3 is pulled to slide rearward to make a distance between the sliding element 3 and the supporting element 2 be wider than a portion of the electronic equipment which is to be gripped by the camera device with the clamping module 100, a rearward pushing force exerted by the protrusion 32 and the second clamping board 34 of the sliding element 3 is exerted to the elastic element 4 and the elastic element 4 is compressed by the rearward pushing force of the protrusion 32 and the second clamping board 34 of the sliding element 3, and then, the sliding element 3 is released, the elastic element 4 restores to an original status to generate a frontward pushing force, the sliding element 3 is pushed to slide frontward to form the gripping force by the frontward pushing force of the elastic element 4, the portion of the electronic equipment is gripped by the sliding element 3 and the supporting element 2 to make the first clamping board 24 and the second clamping board 34 instantly fastened to the frame 201 of the notebook computer 200 or other types of the electronic equipment.

In the first preferred embodiment, the supporting element 2 and the sliding element 3 form the clamping module 320. The camera module 1 is fastened to and pivoted to a top of the clamping module 320. The elastic element 4 is mounted in the clamping module 320.

Referring to FIG. 8 to FIG. 14, the camera device with the clamping module 300 in accordance with the second preferred embodiment is shown from FIG. 8 to FIG. 14. In the second preferred embodiment, the camera device with the clamping module 300 includes the camera module 1, a supporting element 9, a sliding element 10, an elastic element 4, at least two screws 5, the rotation shaft 6, the cable 7, a locking element 8 and a clamping module 930. Preferably, the camera device with the clamping module 300 includes two screws 5.

The camera module 1 is assembled to and pivoted to a top surface of the supporting element 9 to rotate to adjust the viewing angles of the camera module 1. The sliding element 10 is mounted to a lower surface of the supporting element 9. The sliding element 10 and the supporting element 9 are buckled with each other to form a receiving space 910 between the sliding element 10 and the supporting element 9. The elastic element 4 is mounted in the sliding element 10. The elastic element 4 is elastically fastened in the receiving space 910. The one end of the elastic element 4 is locked to the sliding element 10 by one screw 5. The other end of the elastic element 4 abuts against the locking element 8 to ensure that the elastic element 4 is stably fastened with the sliding element 10.

The other screw 5 is fastened to one side of the supporting element 9. The rotation shaft 6 is mounted to the other side of the supporting element 9. The rotation shaft 6 and the other screw 5 are locked with each other. The rotation shaft 6 is in alignment with the other screw 5. One end of the cable 7 is connected to an inside of the camera module 1, and the other end of the cable 7 is connected to the notebook computer 200. In the second preferred embodiment, the elastic element 4 is the compression spring. The other screw 5 and the rotation shaft 6 are assembled into the rotation structure 506.

The camera module 1 includes the front cover 11, the image module 12, the rear cover 13, the transparent piece 14 and the friction ring 15. The image module 12 is disposed in the front cover 11. The image module 12 is used for an image transmission. The rear cover 13 is disposed to the rear end of the image module 12. The transparent piece 14 is mounted to the front surface of the front cover 11. The transparent piece 14 is used for prettifying the camera module 1. The friction ring 15 is disposed in the corresponding mechanism of the front cover 11. The friction ring 15 is used for cooperating with the rotation shaft 6 to make the camera module 1 rotate to adjust the viewing angles of the camera module 1.

The front cover 11 has the base portion 101, the cylindrical pivoting portion 111, the first through-hole 112 and the fixing hole 113. The bottom surface of the base portion 101 is connected with the pivoting portion 111. The pivoting portion 111 is mounted to the corresponding structure of the supporting element 2 to realize the location and the fixation between the camera module 1 and the supporting element 2. The inside of the middle of the pivoting portion 111 is the first through-hole 112 extending transversely. The friction ring 15 is received in the first through-hole 112. The front cover 11 is of the hollow shape. The rear of the front cover 11 is opened freely.

The front surface of the front cover 11 has the fixing hole 113 longitudinally penetrating through the front cover 11. The transparent piece 14 is fixed in the fixing hole 113. A middle of a rear of the rear cover 13 has a perforation 132 longitudinally penetrating through the rear cover 13. The one end of the cable 7 is mounted to the rear end of the image module 12, and the one end of the cable 7 extends outward and passes through the perforation 132. The middle of the friction ring 15 has the second through-hole 151 transversely penetrating through the friction ring 15. The rotation shaft 6 passes through the second through-hole 151 of the friction ring 15 and the first through-hole 112. The front cover 11 and the rear cover 13 are locked and fastened with each other by a plurality of threaded elements 102.

The supporting element 9 has the at least two sliding slots 21, a hollow reinforcing portion 210, the first clamping board 24, the first location portion 25, the second location portion 26, the receiving groove 27, the plurality of the clamping blocks 28 and the clamping groove 29. Preferably, the supporting element 9 has two sliding slots 21. The at least two portions of the middles of the two opposite side surfaces of the supporting element 9 are recessed inward to form the at least two lengthwise sliding slots 21. Two portions of the middles of the two opposite side surfaces of the supporting element 9 are recessed inward to form two lengthwise sliding slots 21. In the second preferred embodiment, the middles of the two opposite side surfaces of the supporting element 9 are recessed inward to form two lengthwise sliding slots 21. Each sliding slot 21 is used for clamping a corresponding sliding portion of the sliding element 10 to make the sliding element 10 slide frontward and rearward. One end of the lower surface of the supporting element 9 protrudes downward to form the hollow reinforcing portion 210. The locking element 8 is locked in a middle of the reinforcing portion 210 to realize that the elastic element 4 is stably fastened in the sliding element 10.

The reinforcing portion 210 is downward positioned in a corresponding space of the sliding element 10. The reinforcing portion 210 moves towards one direction to buckle the two sliding slots 21 with the corresponding sliding portion of the sliding element 10 to improve a combination strength between the supporting element 9 and the sliding element 10. The other end of the lower surface of the supporting element 9 protrudes downward to form the first clamping board 24. The first clamping board 24 cooperates with a corresponding clamping structure of the sliding element 10 to make the camera device with the clamping module 300 stable grip the electronic equipment. A surface of the first clamping board 24 facing the reinforcing portion 210 is equipped with a first pad 241. The first pad 241 cooperates with the corresponding clamping structure of the sliding element 10 for increasing the gripping force of the camera device with the clamping module 300.

The supporting element 9 has the substantially rectangular base holder 202. A substantial middle of a bottom surface of the base holder 202 is recessed inward to form a buffering space 920. Two opposite ends of the bottom surface of the base holder 202 extend downward to form the first clamping board 24 and the reinforcing portion 210 facing to each other. The first clamping board 24 is located to one end of the buffering space 920, and the reinforcing portion 210 is located to the other end of the buffering space 920. The buffering space 920 is located above the elastic element 4.

The one side of the top surface of the base holder 202 protrudes upward to form the annular first location portion 25. The inside of the middle of the first location portion 25 has the cylindrical first locating hole 251 transversely penetrating through the middle of the first location portion 25. The screw 5 is mounted in the first locating hole 251 of the first location portion 25. The other side of the top surface of the base holder 202 protrudes upward to form the annular second location portion 26. The inside of the middle of the second location portion 26 has the irregular second locating hole 261. The second location portion 26 is spaced from the first location portion 25 to form the receiving groove 27 between the second location portion 26 and the first location portion 25. The rotation shaft 6 is mounted in the second location portion 26. The pivoting portion 111 of the camera module 1 is received in the receiving groove 27. The first locating hole 251 of the first location portion 25, the second locating hole 261 of the second location portion 26, the second through-hole 151 of the friction ring 15 and the first through-hole 112 of the pivoting portion 111 are concentric. After the rotation shaft 6 passes through the second locating hole 261 of the second location portion 26, the second through-hole 151 of the friction ring 15 and the section of the first locating hole 251 of the first location portion 25, the rotation shaft 6 is locked to and fastened to the second locating hole 261 of the second location portion 26, the second through-hole 151 of the friction ring 15 and the section of the first locating hole 251 of the first location portion 25 by use of the one screw 5 to make the camera module 1 manually adjust the viewing angles of the camera module 1.

Several portions of the one end of the top surface of the base holder 202 protrude upward to form the plurality of the clamping blocks 28. The two portions of the one end of the top surface of the base holder 202 protrude upward to form the two clamping blocks 28. The two clamping blocks 28 are spaced from each other to form the clamping groove 29 between the two clamping blocks 28. The one end of the cable 7 is positioned in the clamping groove 29. The two clamping blocks 28 and the clamping groove 29 form the cable clamping mechanism 209. The cable clamping mechanism 209 is capable of guiding the weight of the cable 7 or the pulling force exerted by the external force to the gripping force generated by the camera device with the clamping module 300 to be supported or absorbed, the rotation angle deviation of the camera module 1 is prevented from being affected on account of the factor of the cable 7.

The sliding element 10 has the plurality of sliding ribs 31, the cavity 33, the second clamping board 34, a second pad 35, a location surface 36 and a location pillar 37. Two opposite sides of an inside of the sliding element 10 have the plurality of the sliding ribs 31 protruded inward. In the second preferred embodiment, the two opposite sides of the inside of the sliding element 3 have the two sliding ribs 31 protruded inward. The reinforcing portion 210 is downward positioned to front ends of the two sliding ribs 31 to make the two sliding ribs 31 be in alignment with the two sliding slots 21. The reinforcing portion 210 moves towards the one direction to buckle the two sliding slots 21 with the two sliding ribs 31 of the sliding element 10 to reinforce the combination strength between the supporting element 9 and the sliding element 10. The two sliding ribs 31 are mounted in the two sliding slots 21 to make the sliding element 10 move frontward and rearward. A middle of a top surface of the sliding element 10 is recessed downward to form the cavity 33. The elastic element 4 is received in the cavity 33. One end of the sliding element 10 extends downward to form the second clamping board 34 opposite to the reinforcing portion 210. The second clamping board 34 is spaced from and faces to the first clamping board 24. The second clamping board 34 cooperates with the first clamping board 24 to make the camera device with the clamping module 300 stably grip the object which is the electronic equipment. The other end of the sliding element 10 is equipped with the locking element 8. The locking element 8 abuts against the other end of the elastic element 4.

An outer surface of the second clamping board 34 is equipped with the second pad 35 facing to the first pad 241. Each of the first pad 241 and the second pad 35 is a sponge. The second pad 35 cooperates with the first pad 241 for increasing the gripping force of the camera device with the clamping module 300. When the sliding element 10 slides rearward, a rearward pushing force exerted by the second clamping board 34 of the sliding element 10 is exerted to the elastic element 4 and the elastic element 4 is compressed by the rearward pushing force of the second clamping board 34 of the sliding element 10, and then, the sliding element 10 is released, the elastic element 4 restores to the original status to generate the frontward pushing force, the sliding element 10 is pushed to slide frontward to form the gripping force by the frontward pushing force of the elastic element 4, the portion of the electronic equipment is gripped by the sliding element 10 and the supporting element 2 to make the first clamping board 24 and the second clamping board 34 instantly fastened to the frame 201 of the notebook computer 200 or other types of the electronic equipment.

An inner surface of the one end of the sliding element 10 is recessed inward to form the location surface 36. An inner surface of the second clamping board 34 is recessed inward to form the location surface 36. The one end of the elastic element 4 abuts against the location surface 36. A middle of the location surface 36 protrudes rearward to form the location pillar 37 projecting into the cavity 33. The one screw 5 is locked in the location pillar 37 to make the elastic element 4 located in and fastened in the sliding element 10.

In the second preferred embodiment, the clamping module 930 includes the supporting element 9, the sliding element 10, the elastic element 4 and the locking element 8. The camera module 1 is equipped with the rotation shaft 6. The camera module 1 is fastened to and pivoted to a top of the clamping module 930 by the rotation shaft 6. The elastic element 4 is mounted in the clamping module 930.

As described above, the elastic element 4 is elastically fastened in the holding space 203 which is formed between the sliding element 3 and the supporting element 2, or the elastic element 4 is mounted in the sliding element 10, and the one end of the elastic element 4 is locked to the sliding element 10 by the one screw 5, and the other end of the elastic element 4 abuts against the locking element 8, when the sliding element 3 or the sliding element 10 slides rearward, the rearward pushing force exerted by the sliding element 3 or the sliding element 10 is exerted to the elastic element 4 and the elastic element 4 is compressed by the rearward pushing force of the sliding element 3 or the sliding element 10, and then, the sliding element 3 or the sliding element 10 is released, the elastic element 4 restores to the original status to generate the frontward pushing force, the sliding element 3 or the sliding element 10 is pushed to slide frontward to form the gripping force by the frontward pushing force of the elastic element 4, the portion of the electronic equipment is gripped by the sliding element 10 and the supporting element 2 to make the first clamping board 24 and the second clamping board 34 instantly fastened to the frame 201 of the notebook computer 200 or other types of the electronic equipment. Furthermore, after the rotation shaft 6 passes through the second locating hole 261 of the second location portion 26, the second through-hole 151 of the friction ring 15 and the section of the first locating hole 251 of the first location portion 25, the rotation shaft 6 is locked to and fastened to the second locating hole 261 of the second location portion 26, the second through-hole 151 of the friction ring 15 and the section of the first locating hole 251 of the first location portion 25 by use of the screw 5 to make the camera module 1 manually adjust the viewing angles of the camera module 1 of the camera device with the clamping module 100. The two portions of the one end of the top surface of the base holder 202 of the supporting element 2 or the supporting element 9 protrude upward to form the two clamping blocks 28, the two clamping blocks 28 are spaced from each other to form the clamping groove 29 between the two clamping blocks 28, the one end of the cable 7 is positioned in the clamping groove 29, the two clamping blocks 28 and the clamping groove 29 form the cable clamping mechanism 209, the cable clamping mechanism 209 is capable of guiding the weight of the cable 7 or the pulling force exerted by the external force to the gripping force generated by the camera device with the clamping module 100 or the camera device with the clamping module 300 to be supported or absorbed, the rotation angle deviation of the camera module 1 is prevented from being affected on account of the factor of the cable 7. Thus the camera device with the clamping module 100 or the camera device with the clamping module 300 is stably fastened to the notebook computer 200 or other types of the objects which is capable of adjusting the viewing angles of the camera device with the clamping module 100 or the camera device with the clamping module 300.

What is claimed is:

1. A camera device with a clamping module, comprising:
    a clamping module, including:
        a supporting element having a base holder, one end of a bottom surface of the base holder extending downward to form a block, the other end of the bottom surface of the base holder extending downward to form a first clamping board;
        a sliding element mounted to a bottom of the supporting element, the sliding element being located between the block and the first clamping board, one end of the sliding element having a second clamping board corresponding to and facing to the first clamping board; and
        an elastic element received between the supporting element and the sliding element; and
    a camera module equipped with a rotation shaft, the camera module being pivoted to a top of the supporting element by the rotation shaft.

2. The camera device with the clamping module as claimed in claim 1, wherein the block abuts against the one end of the sliding element, a middle of the one end of the bottom surface of the base holder is recessed inward to form an accommodating space, one end of the accommodating space is blocked by the block, and the accommodating space is formed between the block and the first clamping board, the sliding element has a main body, one end of the main body protrudes upward to form a protrusion, the protrusion is blocked in the other end of the accommodating space, the protrusion is opposite to the block, a top surface of the main body is recessed downward to form a cavity, the cavity and the accommodating space are connected and integrated to form a holding space, the elastic element is elastically fastened in the holding space.

3. The camera device with the clamping module as claimed in claim 2, wherein the elastic element is elastically mounted between the block and the protrusion.

4. The camera device with the clamping module as claimed in claim 1, wherein at least two portions of middles of two opposite side surfaces of the supporting element are recessed inward to form at least two lengthwise sliding slots, two opposite sides of an inside of the sliding element have at least two sliding ribs protruded inward, the at least two sliding ribs are clamped in the at least two sliding slots.

5. The camera device with the clamping module as claimed in claim 1, wherein the camera module includes a front cover, an image module, a rear cover and a transparent piece, the image module is disposed in the front cover, the rear cover is disposed behind a rear surface of the image module, the transparent piece is mounted to a front surface of the front cover.

6. The camera device with the clamping module as claimed in claim 5, wherein the front surface of the front cover has a fixing hole longitudinally penetrating through the front cover, the transparent piece is fixed in the fixing hole.

7. The camera device with the clamping module as claimed in claim 5, wherein a bottom surface of the rear cover is recessed upward to form a notch, one end of a cable is connected to a rear end of the image module, and the one end of the cable extends outward and passes through the notch.

8. The camera device with the clamping module as claimed in claim 5, wherein the camera module includes a friction ring, the front cover has a base portion, a bottom surface of the base portion is connected with a pivoting portion, an inside of a middle of the pivoting portion is a first through-hole extending transversely, the friction ring is received in the first through-hole, a middle of the friction ring has a second through-hole transversely penetrating through the friction ring, the rotation shaft passes through the second through-hole and the first through-hole.

9. The camera device with the clamping module as claimed in claim 8, further comprising a rotation structure which includes a screw and the rotation shaft, one side of a top surface of the base holder protruding upward to form an annular first location portion, an inside of a middle of the first location portion having a cylindrical first locating hole transversely penetrating through the middle of the first location portion, the screw being mounted in the first locating hole of the first location portion, the other side of the top surface of the base holder protruding upward to form an annular second location portion, an inside of a middle of the second location portion having an irregular second locating hole, the rotation shaft being mounted in the second location portion.

10. The camera device with the clamping module as claimed in claim 9, wherein the first locating hole of the first location portion, the second locating hole of the second location portion, the second through-hole of the friction ring and the first through-hole of the pivoting portion are concentric, after the rotation shaft passes through the second locating hole of the second location portion, the second through-hole of the friction ring and a section of the first locating hole of the first location portion, the rotation shaft is locked to and fastened to the second locating hole of the second location portion, the second through-hole of the friction ring and the section of the first locating hole of the first location portion by use of the screw.

11. The camera device with the clamping module as claimed in claim 9, wherein the second location portion is spaced from the first location portion to form a receiving groove between the second location portion and the first location portion, the pivoting portion of the camera module is received in the receiving groove.

12. The camera device with the clamping module as claimed in claim 1, wherein two portions of one end of a top surface of the base holder protrude upward to form two clamping blocks, the two clamping blocks are spaced from each other to form a clamping groove between the two clamping blocks, one end of a cable is positioned in the clamping groove.

13. A camera device with a clamping module, comprising:
a clamping module, including:
a supporting element having:
a base holder;
a block positioned at the base holder and extended downward from one end of a bottom surface of the base holder; and
a first clamping board extended downward from the other end of the bottom surface of the base holder;
a sliding element mounted to the supporting element, the sliding element having:
a main body;
a second clamping board extended downward from a bottom surface of the main body, the second clamping board corresponding to and facing to the first clamping board; and
a protrusion protruded upward from one end of the main body and opposite to the block;
an elastic element being elastically mounted between the block and the protrusion;
at least two sliding ribs protruded from one of the base holder and the main body; and
at least two sliding slots formed at the other one of the base holder and the main body, the at least two sliding ribs being slidably mounted in the at least two sliding slots; and
a camera module pivoted to one of the supporting element and the sliding element of the clamping module.

14. A camera device with a clamping module, comprising:
a clamping module, including:
a supporting element, one end of a lower surface of the supporting element protruding downward to form a hollow reinforcing portion, the other end of the lower surface of the supporting element protruding downward to form a first clamping board;
a sliding element mounted to the lower surface of the supporting element, one end of the sliding element extending downward to form a second clamping board opposite to the reinforcing portion, the second clamping board being spaced from and facing to the first clamping board;
a locking element locked in a middle of the reinforcing portion; and
an elastic element received between the supporting element and the sliding element, one end of the elastic element being locked to the sliding element, and the other end of the elastic element abutting against the locking element; and
a camera module equipped with a rotation shaft, the camera module being pivoted to a top of the supporting element by the rotation shaft.

15. The camera device with the clamping module as claimed in claim 14, wherein a top surface of the sliding element is recessed downward to form a cavity, an inner surface of the one end of the sliding element is recessed inward to form a location surface, the elastic element is received in the cavity, one end of the elastic element abuts against the location surface, the other end of the sliding element is equipped with the locking element, the locking element abuts against the other end of the elastic element.

16. The camera device with the clamping module as claimed in claim 15, wherein an inner surface of the second clamping board is recessed inward to form the location surface.

17. The camera device with the clamping module as claimed in claim 15, wherein a middle of the location surface protrudes rearward to form a location pillar projecting into the cavity, one screw is locked in the location pillar.

18. The camera device with the clamping module as claimed in claim 14, wherein a surface of the first clamping board facing the reinforcing portion is equipped with a first pad.

19. The camera device with the clamping module as claimed in claim 18, wherein an outer surface of the second clamping board is equipped with a second pad facing to the first pad.

20. The camera device with the clamping module as claimed in claim 19, wherein each of the first pad and the second pad is a sponge.

* * * * *